United States Patent [19]

Baker et al.

[11] Patent Number: 4,837,035
[45] Date of Patent: Jun. 6, 1989

[54] LOW FAT CUSTARD-TYPE YOGURT PRODUCT AND METHOD

[75] Inventors: Donald B. Baker, Tulsa; Vanessa Hulett, Jenks, both of Okla.

[73] Assignee: The Pro-Mark Companies, Inc., Tulsa, Okla.

[21] Appl. No.: 52,988

[22] Filed: May 22, 1987

[51] Int. Cl.$^4$ .................... A23C 9/123; A23C 9/133; A23L 1/236

[52] U.S. Cl. ....................... 426/43; 426/61; 426/583; 426/588; 426/548

[58] Field of Search ............ 426/34, 42, 43, 583, 426/522, 588, 548, 61, 658

[56] References Cited

U.S. PATENT DOCUMENTS

| | | |
|---|---|---|
| 3,128,190 | 4/1964 | Donay . |
| 3,269,842 | 8/1966 | Mayer et al. . |
| 3,677,897 | 7/1972 | Jeffreys . |
| 3,897,307 | 7/1975 | Porubcan et al. . |
| 3,932,680 | 1/1976 | Egli et al. . |
| 3,969,534 | 7/1976 | Pavey et al. . |
| 4,096,287 | 6/1978 | Kemp . |
| 4,110,476 | 8/1978 | Rhodes . |
| 4,163,802 | 8/1979 | Redfern et al. . |
| 4,216,243 | 8/1980 | Hermann . |
| 4,258,064 | 3/1981 | Michener, Jr. . |
| 4,410,549 | 10/1983 | Baker . |
| 4,416,905 | 11/1983 | Lundstedt et al. . |
| 4,430,349 | 2/1984 | Malone et al. . |

FOREIGN PATENT DOCUMENTS 809598 2/1959 United Kingdom .
871909 7/1961 United Kingdom .

OTHER PUBLICATIONS

Webb et al., Byproducts From Milk, 2nd Ed., The Ari Publishing Co., Inc., Westport, Conn., 1975 (pp. 38–40).
Kosikowski, Cheese and Fermented Milk Foods, Ithaca, N.Y., 1977 (68–89).

*Primary Examiner*—Marianne Cintins
*Attorney, Agent, or Firm*—Sixbey, Friedman, Leedom & Ferguson

[57] ABSTRACT

A low calorie, low fat, low carbohydrate, fruit-containing yogurt product is prepared by a process including the steps of admixing a butterfat-containing milk product in sufficient amount to provide a butterfat content in the yogurt product of less than about 0.2% by weight, a stabilizer, a nutritive sweetener, and non-heat modified nonfat dry milk solids and processing the mixture by homogenizing, vat pasteurizing, fermenting with a three component bacterial yogurt culture mixture consisting essentially of *Lactobacillus acidophilus*, *Lactobacillus bulgaricus* and *Streptococcus thermophilus*, blending with low calorie, nutritive sweetener-containing fruit preserves and cooling. The resultant yogurt product has the body, texture and taste of conventional fruit-containing yogurt and a consumer acceptable appearance characterized by the absence of free moisture on the product surface and within the packaging therefor.

30 Claims, No Drawings

LOW FAT CUSTARD-TYPE YOGURT PRODUCT AND METHOD

BACKGROUND OF THE INVENTION

1. Field of the Invention

The present invention relates generally to a method for making a fruit-containing yogurt product and, more specifically, to a method for making a low fat low carbohydrate, low calorie fruit-containing yogurt product having the appearance, texture and taste of conventional fruit-containing yogurt.

2. Description of the Prior Art

In recent years cultured milk products, referred to as yogurt, have enjoyed immense popularity. The beneficial effects on health due to the therapeutic properties of the bacterial cultures contained in yogurt are well known. In addition, yogurt has become a popular food among dieters. To increase its appeal, the sharp, tangy taste characteristic of plain, unflavored yogurt, which heretofore make yogurt unacceotable to many people, has been masked in many yogurt products with fruit and sweeteners. This practice has resulted in a flavored yogurt product that is more palatable to a wider segment of the population. However, the use of these additives has been accompanied by an increase in product calorie content from about 90 calories per eight ounce (227 grams) serving of plain, unflavored yogurt to about 240 to 270 calories per eight ounce (227 grams) serving of the sweetened, fruit-containing yogurt. Such a high calorie content renders the fruited product generally unsuitable for inclusion in reducing diets since the fruit yogurt uses up the majority of the calories usually alloted to a single meal. As a result the dieter has difficulty choosing a sufficient variety or quantity of foods to form a balanced meal within the remaining calories allowed. Accordingly there has existed for some time a need for a fruit-containing yogurt product which is low in calories, fat and carbohydrate content.

There have been efforts, none of them totally successful, at producing a sweetened or flavored yogurt product with a relatively low butterfat content but which exhibits the characteristic creamy consistency and desirable flavor, appearance and mouth feel of conventional yogurt products while, at the same time, overcoming the high calorie and high carbohydrate problems accompanying the use of fruited or flavored yougurt. One very important reason for the apparent inability to achieve this goal is that yogurt made from really low fat milk products, e.g., less than about 0.5% butterfat, is typically loose and watery and lacking in flavor, rather than creamy and with consumer acceptable flavor, appearance, body and mouth feel. Moreover, yogurt having such an undesirably thin consistency does not blend well with fruit additions and, therefore, the fruit additions do not meaningfully add to the attractiveness and palatability of the yogurt product. Efforts to overcome this problem to obtain a palatable product have either required adding flavor influencing milk solids, which increases the yogurt calorie and carbohydrate contents, or increasing the butterfat content, which has a similar effect. It will, therefore, be appreciated that in the production of fruited yogurt, acceptable solutions to taste and diet problems appear to adversely affect appearance, body and mouth feel characteristics, and vice-versa. Accordingly, it is not at all surprising that to date, no fully acceptable low fat, low calorie, low carbohydrate yogurt product has become available.

To be sure there have been serious efforts at producing yogurt products having at least some of these desirable attributes. For example, in U.S. Pat. No. 3,969,354, Pavey et al, teach the production of a fruited, flavored yogurt which has a relatively low, not exceeding about 0.5% by weight, butterfat content. However, the Pavey method requires post-culturing heat treatment and homogenization to achieve whey separation, extensive curd coagulation, and product restructuring. As a result, the appearance, body and mouth feel of the Pavey yogurt will be demonstrably distinguishable from a product not so treated. Moreover, the Pavey process makes no effort to control or minimize the carbohydrate or calorie content of its resulting yogurt product in order to produce a product which is below the 240 to 270 calories/8 ounce serving calorie content and the 32 to 35 grams/8 ounce serving carbohydrate content of conventional fruited yogurt products. In U.S. Pat. No. 3,128,190, Donay discloses the use of a skim milk starting material. However, the process for making Donay's fruit-containing yogurt requires fruit which is precooked with sucrose to prevent fermentation thereof by the yogurt cultures with resultant unpleasant flavors. As a result of this procedure the Donay et al method neither produces really low fat yogurt nor reduces the high calorie and carbohydrate content of conventional fruit-containing yogurts. In U.S. Pat. No. 4,110,476, Rhodes discloses a process for preparing liquid, rather than custard-type, yogurt products which utilize whey protein concentrate together with milk products as the starting material ingredients and contain higher sugar contents than are desirable for a fruit-containing yogurt product suitable for a reducing diet. In U.S. Pat. No. 3,269,842, the fruited yogurt product produced by the Mayer et al process has a fat content of about 4% and appears to be an undesirably high calorie, high carbohydrate product.

Probably the most ambitious effort at producing a consumer acceptable low fat, low calorie, low carbohydrate yogurt product is disclosed in U.S. Pat. No. 4,410,549-Baker wherein a low calorie, low fat, fruit-containing yogurt is prepared by a process including the steps of admixing skim milk, stabilizers and heat modified nonfat dry milk solids, and processing the mixture by heating, homogenizing, fermenting with a culture mixture of *Lactobacillus acidophilus, Lactobacillus bulgaricus* and *Streptococcus thermophilus*, blending with low calorie fruit preserves and cooling. The heat modified nonfat dry milk solids are derived from a process in which condensed skim milk is subjected to non-coagulative direct steam heating prior to spray drying. Although the resultant yogurt product had the consistency, texture and taste of conventional fruit-containing yogurt, the packaged product exhibited puddling, i.e., it released free moisture which accumulated around the edge of the yogurt cup and covered all or part of the product surface. This departure from the conventional and consumer-anticipated appearance of yogurt is an undesirable aspect of the product of the Baker process.

it is, therefore, apparent that despite the numerous efforts to produce a satisfactory, low fat consumer acceptable yogurt product, there still exists a need for such a product and, in particular, for a low fat, fruit-containing yogurt which is low in calories and low in carbohydrates while resembling conventional yogurt in appearance, texture, body and taste.

SUMMARY OF THE INVENTION

In accordance with one broad aspect of the present invention, there is provided a fruit-containing yogurt product which resembles conventional yogurt in appearance, texture and taste, but which has a fat, carbohydrate and calorie content significantly below that of known yogurt products.

In accordance with another aspect of the present invention, there is provided a fruit-containing, spoonable, custard or pudding-type yogurt product which is nutritionally equivalent to an average serving of milk and fruit, but is sufficiently low in fat, carbohydrate and calories to be included as a desirable component of a reducing diet.

In accordance with still another aspect of the present invention, there is provided a nutritious, palatable, fruit-containing yogurt product which has the creamy mouth feel and the sweet, fruity, slightly tangy taste of conventional spoonable, custard or pudding-type yogurt but which has a butterfat content below about 0.2% by weight of the final product and a carbohydrate content of about 29 grams/8 ounce (227 gram) serving.

In yet another aspect of the present invention there is provided a method for making a very low fat, low carbohydrate, low calorie, fruit-containing, spoonable, custard or pudding-type yogurt product which resembles conventional yogurt in appearance, texture, body and taste, such method including the steps of admixing a butterfat-containing milk product, e.g., pasteurized skim milk, in sufficient amount to provide a butterfat content in said yogurt product of less than about 0.2%, preferably less than about 0.1%, with suitable stabilizers, non-heat modified nonfat dry milk solids and a nutritive sweetner, preferably, sucrose; optionally adding vitamin and mineral fortification, other sweeteners, flavorants and/or colorants; homogenizing the mixture under conventional elevated pressure conditions at 500 to 5000 psig (35.15 to 351.5 kg/cm$^2$), desirably 1000 to 2000 psig (70.03 to 140.06 kg/cm$^2$) and preferably at 1200 to 1500 psig (84.36 to 105.45 kg/cm$^2$); heating the mixture with constant agitation to about 190° to 195° F. (87.7° to 90.6° C.) for about 20 to 60 minutes; and adding optional heat labile vitamins, such as Vitamin C. The homogenized mixture is cooled to about $\pi$° to 120° F. (32.2° to 48.9° C.), preferably 96° to 110° F. (35.5° to 43.3° C.), and inoculated with a uniquely proportioned blend of standard yogurt cultures.

In one preferred aspect of the invention, when it is desired to produce a Swiss style yogurt which has pieces of fruit homogeneously mixed throughout and a predominantly fruity flavor, the inoculated mixture is maintained at the inoculation temperature until the desired taste and custard body are achieved, which is usually at a pH of about 4.3 to 4.9 preferably 4.5 4.7 and, most desirably, 4.7. The yogurt is then cooled to about 50° to 75° F. (10° to 23.9° C.), preferably 65° to 70° F. (18.3° to 21.1° C.), and pumped through a small orifice, such as a screw or pressure valve, to break up small pieces of coagulant which are present and to produce a smooth, continuous mass, all as is well known in the art. Low calorise, low carbohydrate fruit preserves are thoroughly blended into the custard, and the resulting product is packaged in suitable individual containers and refrigerated at temperatures sufficiently low to stop fermentation, generally 35° to 50° F. (1.7° to 10° C.), and preferably about 38° F. (3.3° C.). The resulting low calorie, low carbohydrate, low fat product, which resembles conventional Swiss style yogurt with its smooth, creamy texture and slightly tangy fruity flavor, contains pieces of fruit suspended throughout.

In another preferred aspect of the invention, when it is desired to produce Western style yogurt in which a deep layer of plain or unflavored yogurt custard covers a shallow layer of fruit preserves, the inoculated milk product stabilizer-milk solids-nutritive sweetener mixture is pumped into individual containers, such as conventional 8 ounce (227 gram) yogurt containers to which has already been added 1.0 ounce (28.4 grams) of low calorie fruit preserves. The containers are then maintained at about 96° to 110° F. (35.5 to 43.3%), preferably 100° to 105° F. (37.8° to 40.5° C.), until the desired taste and custard body has been achieved, which is usually when the pH of the yogurt is about 4.3 to 4.9, preferably 4.5 to 4.7, and, most desirably, 4.7, and are then cooled to a temperature sufficiently low to stop fermentation, generally 35° to 50° F. (1.7° to 10° C.), preferably to conventional refrigeration temperatures, until ready for sale. The resulting low calorie, low fat product has a smooth, creamy custard texture and, a relatively tart yogurt taste which becomes sweeter and predominantly fruity when the preserves at the bottom are stirred into the yogurt.

DETAILED DESCRIPTION OF THE INVENTION

Yogurt is, conventionally, a cultured milk product produced by fermenting sources of butterfat, such as milk, skim milk, cream, nonfat milk solids, and the like, in liquid or powder form, with a yogurt culture producing lactic acid. Depending upon the butterfat source employed on the processing treatment, yogurt may be prepared in frozen, firm-bodied, thin-bodied, and liquid form, and, with fat contents varying from as low as less than 0.4 percent by weight up to about 20 percent. According to FDA labeling standards, yogurt may be labeled as "nonfat" if it contains 0.4% or less butterfat; as "lowfat" if it contains from 0.5% to 2% butterfat; and as fullfat or regular yogurt if it contains at least 3.25% butterfat. Frozen yogurt is generally consumed in hard frozen form. Liquid yogurt, at the other extreme, is consumed by drinking as contrasted with by use of a spoon. The most common or so-called conventional form of yogurt is firm bodied, viscous, like a gel, pudding or custard-like in consistency and spoonable. What has now become known as European style yogurt is a slightly thinner consistency than conventional yogurt, but not as thin as liquid yogurt, and not drinkable. Fruit-filled yogurts are made Sundae style with fruit on the bottom, Swiss style with the fruit pre-mixed, or Western style with the fruit on the bottom and the yogurt colored and/or flavored. Most plain yogurt (unfruited) on the market contains from 120 to 150 calories per 8 ounce (227 grams) serving. Most fruited yogurts are lowfat by FDA labeling standards and contain 240 to 270 calories per 8 ounce (227 gram) serving.

The present invention relates broadly to a fruit-containing yogurt product which is nonfat by FDA labeling standards and resembles conventional custard-type, fruit-containing yogurt in appearance, texture and taste, but which has fat, calorie and carbohydrate contents substantially reduced below those of conventional low fat fruited yogurt. As a result, the yogurt made by the method of the present invention is suitable for inclusion in the diets of persons for whom a reduced intake of fat, carbohydrates or calories is necessary or desirable. In its preferred form, the low calorie, low fat, custard-type, fruit-containing yogurt product of the present invention comprises a major amount of pasteurized, homogenized cultured skim milk and minor amounts of nutritive sweeteners, low calorie fruit preserves and stabilizers. Vitamins, minerals and flavorants are optional. Most importantly, the product of the present invention has a total fat content by weight of less than about 0.2%, preferably less than about 0.1%, a total carbohydrate content of about 29 grams per 8 ounce (227 gram) serving, i.e., 12–13% by weight, and contributes only about 150 calories per 8 ounce (227 gram) serving to the diet. Desirably, the product has a pH in the range 4.0 to 4.5, preferably 4.1 to 4.3, a total solids content of about 17 to 20%, preferably 19%, and contains about 12% to 20%, preferably 12% to 15%, and, most desirably, about 12% by weight fruit.

The process by which the fruit-containing yogurt product of the present invention is made involves admixing, preferably at a slightly elevated temperature of about 100° F. (37.8° C.), a butterfat-containing milk product, e.g., pasteurized skim milk, in sufficient amount to provide a butterfat content in the yogurt product of less than about 0.2% by weight, stabilizers, a nutritive sweetener, preferably, sucrose, and nonheat modified nonfat dry milk solids; optionally adding vitamins and minerals, other sweeteners, flavorants and/or colorants to the admixture; homogenizing the resulting mixture by conventional homogenization means; heating the resulting mixture to a temperature of about 190° F. to 195° F. (87.7° to 90.6° C.) to vat pasteurize; and, adding optional heat labile vitamins, such as Vitamin C. The mixture is then cooled to a temperature of about 90° to 120° F. (32.2° to 48.9° C.), preferably 96° to 110° F. (35.5° to 43.3° C.) and inoculated with a uniquely proportioned blend of standard lactic acid producing yogurt cultures. Depending on whether a Swiss style or a Western style yogurt is desired, the inoculated mixture is maintained at this temperature in the bulk mixing vat until the desired taste and texture are achieved, then cooled to about 50° to 75° F. (10° to 23.9° C), pumped through a screw or pressure valve and admixed with fruit preserves prior to packaging and refrigeration (Swiss style) or placed in conventional yogurt containers to which fruit has already been added and maintained at about 96° to 110° F. (35.5° to 43.3° C.), while in the containers until the product has achieved an acceptable taste and texture before being cooled at conventional refrigeration temperatures (Western style).

In order to prepare a yogurt product having a fat content not greater than about 0.2% by weight the use of fat contributing ingredients must be carefully controlled. Inasmusch as the primary fat contributing ingredient in yogurt is generally milk, a low fat content may be achieved by selecting a skim milk with a butterfat content of less than abut 0.2% by weight, and preferably less than about 0.1% by weight, for use as the starting material in the process of the present invention. The term "milk" as used herein means the conventional milk of commence (butterfat content ranging from about 0.1% to 3.5% by weight) as well as equivalent compositions formed by suitable admixtures of milk solids and water.

The primary carbohydrate containing ingredients in yogurt are nutritive sweeteners which, in accordance with the present invention, are added both to the yogurt base mix, i.e., the butterfat containing milk product-stabilizer-nonfat milk solids mix which is inoculated and cultured, and to the fruit component. Quite surprisingly it has been found that this split or two-part nutritive sweetener addition provides an enhanced sweetening and flavoring effect compared to making a single addition, either to the base mix or the fruit component, for any given amount of sweetener added. Although the reason for this enhanced sweetening effect is not completely understood it is believed that the presence of large amounts of sugar suppresses, at least in part, the lactic acid fermentation. As a result, not only do sugars remain because they are not converted to lactic acid, but also, there is less tart lactic acid to influence the yogurt flavor. The result is a sweeter yogurt notwithstanding that no extra sweetener has been added. By thus achieving a higher sweetening effect without adding extra sweetener the amount of sweetener used in the preparation of the instant fruit-containing yogurt can be regulated and the carbohydrate content of the yogurt product can be minimized. Using this technique, the carbohydrates content of the fruited yogurt product of the present invention can be limited to about 29 grams per 8 ounce (227 gram) serving, which is significantly less than the 32 to 35 grams of carbohydrate per 8 ounce (227 gram) serving of conventional fruited yogurt.

Typically, the fruit added to yogurt resembles fruit preserves having discrete pieces of fruit or whole berries in a thickened sugar syrup. Fruit in this form effectively masks the flavor of the yogurt with a predominantly sweet, fruity taste and is less likely to be fermented by the yogurt bacteria. The process of the present invention provides a low carbohydrate, low calorie, fruit-containing yogurt product by utilizing fruit which has been prepared to resemble the preserves heretofore used in conventional yogurt, but which is low in calorie content and which contains only a portion of the nutritive sweeteners added during the process. If desired, particularly where the economics are favorable, the fruit component may contain, in addition to conventional disaccharide sugars, monosaccharide sugars having high sweetening effects. For example, the syrup for the fruit pieces can be advantageously prepared using a combination of fructose and sucrose as the sweetener, with the sucrose comprising from 40 to 100% by weight of the sweetener, balance fructose. It is particularly desirable from a taste standpoint for the sweetener employed to be 100% sucrose. However, a fructose-containing fruit component sweetener which has been found to be very satisfactory comprises about 60% sucrose and 40% fructose, by weight. A preferred fruit preserve preparation which has been found to achieve the desired results contains 40% to 50by weight fruit pieces or whole berries cooked in a syrup made from a suitable sweetener containing at least 40% sucrose and thickened with pectin. The resulting preserves contain about 41% to 47% solids, are at the normal pH for the specific fruit used, and contain not more than 825 to 1000 calories per pound (1815 to 2200 calories per kg), preferably 1000 calories per pound (2200 calories per kg) of preserves. Any of the fruits and berries commonly usded in conventional fruit-containing yogurt products, such as strawberries, blueberries, cherriers and the like, may be prepared for use in the product of the present invention. The combination of a low level of carbohydrates and a low level of fat results in a yogurt product having significantly fewer calories than prior products. In this connection, because the carbohydrate level of the fruit-containing yogurt product of the present invention is so very carefully controlled by carefully limiting the timing and quantity of sweetener additions, the pH level of the fruit component should be carefully controlled to the range 4.1 to 4.3 by the addition, where necessary, of a pH adjuster such as citric acid or sodium citrate. Controlled fruit component pH is very important in a yogurt product such as this, which does not contain excess sweeteners to overcome the flavor influencing effects of excess fruit acidity or alkalinity.

To prepare the low calorie fruit-containing yogurt of the present invention in a preferred embodiment, pasteurized skim milk having a fat content of less than abut 0.2% by weight, preferably less than about 0.1% by weight, is placed in a stainless steel mixing vat or like container and may be heated, if desired, to about 100° F. (37.8° C.) to facilitate its admixture with the other ingredients. The skim milk may have been pasteurized by any conventional means, although it is preferred to use skim milk which has been pasteurized by the high temperature, short time (HTST) method. To the skim milk are added stabilizers, sugar and non-heat modified nonfat dry milk solids. Preferred stabilizers include modified food starch, agar, pectin, guar gum and gelatin. However, other commonly used commercially available dairy stabilizers could also be utilized, either alone or in combination. The stabilizer or combination of stabilizers comprise about 0.8 to 1.2% by weight of the final product. The non-heat modified nonfat dry milk solids generally comprise about 3 to 4% by weight of the final product, the amount of milk solids being based in part on the solids content of the skim milk. In order to achieve the low fat, low carbohydrate and low calorie levels of the yogurt of the present invention yet provide a custard-type product having a creamy consumer acceptable appearance in the yogurt cup, rather than a wet product having free moisture around the edges of the cup and covering the yogurt surface, as in prior low fat, low calorie yogurt products, the dry milk solids should be of the non-heat modified type. This is a very surprising observation since, in the past, it had been believed that specially heat modified nonfat dry milk solids were the ingredients of choice for developing acceptable texture, body and mouth feel in low butterfat-containing milk products. See, for example, U.S. Pat. No. 4,410,549. However, in the preparation of the fruited yogurt product of the present invention, which utilizes a unique three-component bacterial culture mix, it is believed that there is an adverse interaction between the elongated protein micelles of the heat modified nonfat milk solids and at least one of the yogurt culture strains which results in undesirable puddling within the cup. By contrast, it has been found that non-heat modified or so-called conventional nonfat milk solids interact with one or more of the culture strains to create body and aid congealing of the milk. As is well known, the conventional or non-heat modified nonfat milk solids have been available for decades and are made by pasteurizing fresh skim milk (less than 0.4% butterfat) by high temperature short time (HTST) techniques and then spray drying the pasteurized skim milk. Thus, as used herein, the terms conventional or non-heat modified nonfat milk solids refer to milk solids which have been subjected to no heat treatment prior to spray drying other than pasteurization. By contrast, heat modified nonfat milk solids, as is well known, are milk solids which have been subjected to pre-spray drying heat treatment techniques which alter their properties. Exemplary of such milk solids are those prepared according to the process disclosed in U.S. Pat. No. 4,096,287 - Kemp which teaches the step of non-coagulative direct steam heating of condensed skim milk prior to spray drying.

It has been found convenient to premix the stabilizers and nonfat dry milk solids in the amounts normally used for production so that the nonfat dry milk solids serve as a carrier for the stabilizers. In this connection, as previously indicated, it is acceptable to use admixtures of nonfat dry milk solids and water in lieu of the skim milk in the process of the present invention. If this is done, preparation of the milk starting ingredient must be consistent with the desired 17 to 20% by weight, preferably about 19% by weight, total solids in the final product.

It may in some instances be desirable to fortify the fruit-containing yogurt product of the present invention with vitamins and minerals so that an eight ounce (227 gram) serving is nutritionally equivalent to a single serving of milk, which is usually eight ounces (227 gram), and a single serving of fruit, which varies according to the kind of fruit. Such fortification, while not essential to the present invention, results in a product of greater nutritional value than a non-fortified product and facilitates the intake of the recommended daily allowances of these vitamins and minerals. Heat labile vitamins and minerals, such as Vitamin C, which are destroyed by prolonged high temperatures, should not be added at this stage of the process, but are preferably added at a later time after high temperature heating has taken place.

At this stage in the process, particularly if the end product is to be a Western style yogurt in which the fruit is on the bottom, it may be desirable to add a sweetener, flavor enhancer or colorant. Addition of one or any combination of these ingredient materials produces a yogurt custard that is sweet, flavored and/or colored without the fruit being stirred therethrough. Any sweetener used should not, in combination with the sweetener added to the base mix and the sweetened fruit, exceed the desired carbohydrate level of about 12 to 13% by weight of the product. In this connection, the sweeteners employed at any point in this process are nutritive sweeteners, such as the well known mono- and disaccharides. However, other well known nutritive sweeteners, such as aspartame, may be employed provided their use in yogurt products is permitted. Any one of a number of commercially available and well known flavor enhancers and/or certified food grade colorings may also be used.

The skim milk-stabilizer-nonfat dry milk solids-sugar mixture, which may optionally contain vitamins, minerals, sweeteners, flavorants and/or colorants, optionally may be pasteurized at this stage by high temperature, short time (HTST) techniques. The pasteurized or unpasteurized mixture is then homogenized by conventional homogenization means at about 500–5000 psig (35.15 to 351.5 kg/cm$^2$), desirably 1000 to 2000 psig (70.03 to 140.06 kg/cm$^2$), and preferably 1200 to 1500 psig (84.36 to 105.45 kg/cm$^2$), after which it is heated to a temperature in the range from about 190° to 195° F. (87.7° to 90.6° C.) for a time sufficient to form a uniform, substantially homogeneous mixture and to vat pasteurize the mixture, usually about 20–60 minutes. Heat treating at this high temperature denatures the milk protein, causing water in the mixture to be absorbed and helps to create a thicker, richer product having a custard-type body and texture. The heat labile vitamins and minerals, such as Vitamin C, may be addd once the heat treatment at 190°–195° F. (87.7° to 90.6° C.) is complete and the mixture has cooled below the temperature at which the particular vitamin and/or mineral might be adversely affected. The mixture is cooled to an optimum culturing temperature, generally in the range 90° to 120° F. (32.2° to 48.9° C.) and preferably 96°–110° F. (35.5° to 43.3° C.) in preparation for bacterial inoculation, although the temperature may vary slightly according to the bacterial culture or cultures used.

The pasteurized, homogenized mixture is inoculated with a uniquely proportioned blend of lactic acid producing bacterial cultures commonly used in yogurt production in order to confer upon the final yogurt product the proper combination of acidity, tartness and body appropriate for a custard-type yogurt product. Preferred as constituents of the customized yogurt culture for use in the process of the present invention are *Lactobacillus bulgaricus, Streptococcus thermophilus* and *Lactobacillus acidophilus*. It has been found that when all three of these bacterial cultures are simultaneously employed in predetermined proportions, even very low fat milk-containing mixtures can be cultured to achieve the important custard-type creamy body and mouth feel of conventional yogurt while, at the same time, achieving the desired tartness and acidity. This cannot be successfully achieved with other than all three bacterial cultures employed in the following proportions by weight:

*Lactobacillus acidophilus:* 30–50%
*Lactobacillus bulgaricus:* 25–35%
*Streptococcus thermophilus:* 25–35%

The proper combination of cultures is generally determined by the amount of *Lactobacillus acidophilus* required to culture the low fat milk mixture to a stringy, rubbery body texture which will yield an acceptable custard-type creamy mouth feel. The *Lactobacillus bulgaricus* and *Streptococcus thermophilus* comprise the balance of the culture in about equal proportions. It has been found that to achieve the optimum body, texture and mouth feel in the yogurt product while, at the same time, interacting most advantageously with the non-heat modified nonfat milk solids to provide a product having a consumer acceptable appearance, particularly characterized by the absence of free moisture within the yogurt cup, a particularly desirable bacterial culture mix has equal proportions by weight (1:1:1) of the three culture strains, i.e., 33.33% *Lactobacillus acidophilus,* 33.33% *Lactobacillus bulgaricus* and 33.33% *Streptococcus thermophilus.* Other advantageous and particularly useful culture mixes have the proportions 40% *Lactobacillus acidophilus,* 30% *Lactobacillus bulgaricus* and 30% *Streptococcus thermophilus* and 50% *Lactobacillus acidophilus,* 25% *Lactobacillus bulgarius* and 25% *Lactobacillus thermophilus.*

In order to demonstrate the particular effectiveness and synergistic interaction of the three component bacterial culture mix in combination with non-heat modified nonfat milk solids in producing a low fat, low calorie, fruited yogurt product having consumer acceptable appearance, laboratory evaluations were conducted and visual comparisons made of sample yogurt products prepared as set forth in Example I hereof.

EXAMPLE I

Fruited yogurt products were prepared in accordance with the process of the present invention using (i) heat modified nonfat milk solids ("PMC" brand available from The Pro-Mark Companies, Inc. of Tulsa, OK) and (ii) non-heat modified nonfat milk solids. Two different three-component bacterial culture mixes were employed with each type of milk solids and the resulting four (4) fruited yogurt products were visually compared in the laboratory and by consumer focus groups.

A yogurt base was prepared by admixing in a culturing vat HTST pasteurized skim milk containing less than 0.2% butterfat by weight, a blend of stabilizers, water, granulated sugar and nonfat dry milk solids and the resulting mixture was homogenized, vat pasteurized at 190°–195° F. for 30 minutes, cooled to 100° F. and inoculated with a three-component yogurt culture mix. Culturing was continued until the pH reached 4.5–4.6 at which time the cultured mix was cooled quickly to 65°–70° F., pumped to a flavoring tank via an in-line screen and admixed with a fruit component added thereto in the tank at a rate of 12% by weight. The fruit was well blended into the yogurt base and a number of 8 ounce cups were filled with the resulting fruited yogurt.

The following four groups of fruited yogurt products were made utilizing the following combinations of milk solids and three strain cultures:

1. Using heat modified nonfat milk solids
   (a) 25/25/50 *S. thermophilus/L.bulgaricus/L.acidophilus*
   (b) 33/33/33 *S. thermophilus/L.bulgaricus/L.acidophilus*
2. Using non-heat modified nonfat milk solids
   (a) 25/25/50 *S. thermophilus/L.bulgaricus/L.acidophilus*
   (b) 33/33/33 *S. thermophilus/L.bulgaricus/L.acidophilus*

The four groups of products were compared with the following results:

1.(a) and (b) - both products (a) and (b) had noticeable amounts of free moisture covering the top of the product within the cup, although (a) had more moisture than (b). The consumer panels raised objection to the amount of moisture present on top of the products, indicating they did not like the appearance at all.

2.(a) and (b) - neither product (a) nor (b) evidenced any free moisture within the cup or on the product. The consumer panels judged both products to be extremely pleasing and made no adverse comments about either.

To this point in the process there has been no significant difference in processing between the preparation of Swiss style yogurt, which has a predominantly fruity flavor and contains pieces of fruit uniformly dispersed throughout the yogurt, custard, and the preparation of Western style yogurt, which has a shallow layer of fruit preserves on the bottom of the yogurt container covered by a deep layer of yogurt custard. The primary difference in processing the two types is that the Swiss style is cultured in the bulk mixing vat before packaging while the Western style is cultured in the individual containers in which it is packaged.

If a Swiss style yogurt is desired, the cultured mixture is maintained at about 110° F. (43.3° C.) until a yogurt custard with an acceptable body and taste is produced. Although taste and texture are highly subjective and will vary from producer to producer, experience has shown that when the product reaches a pH in the range of about 4.3 to 4.9, preferably about 4.5 to 4.7, which typically takes about two to four hours, and acceptably firm yogurt custard with a pleasantly sharp, tangy taste has been produced. When an acceptable product from the standpoint of taste and texture has been produced, the yogurt is cooled to about 50° to 75° F. (10° to 23.9° C.), preferably about 65° to 70° F. (18.3° to 21.1° C.), to slow the fermentation while maintaining a sufficiently fluid mixture so that it can be readily pumped through a screw or pressure valve. The cooled mixture is then pumped through a screw or pressure valve to achieve a smooth texture. Fruit preserves are thoroughly blended into the yogurt custard, preferably at a level of about 12% to 20% by weight fruit in the final product. The resulting product is packaged in conventional yogurt containers and held at conventional refrigeration temperatures, about 35° to 40° F. (1.7° to 4.4° C.), to fully terminate fermentation. When maintained under conventional refrigeration temperatures, the product has a shelf life of about 30 days.

If a Western style yogurt is desired, about one ounce (28.4 grams) of fruit preserves is placed in the bottom of conventional eight ounce (227 gram) yogurt containers. On top of this is added about seven ounces (199 grams) of the culture-containing, pasteurized, homogenized mixture. The fruit comprises preferably about 12% to 20% by weight of the final product. The filled containers are maintained at about 110° F. (43.3° C.) until an acceptable taste and texture are produced in the yogurt custard. As with Swiss style yogurt, the notion of what constitutes a suitable product is likely to vary, with acceptable results generally reached when the pH of the product is about 4.3 to 4.9, preferably 4.5 to 4.7. This pH level is generally reached in about two to four hours. The containers are thereafter cooled to and maintained at conventional refrigeration temperatures to stop the fermentation, usually about 35° to 40° F. (1.7° to 4.4° C.). Under these conditions the product has a shelf life of about 30 days.

The following examples illustrate the practice of the present invention and are intended to exemplify and not to limit in any respect the content and scope thereof.

EXAMPLE II

A low calorie, low fat Swiss style yogurt was prepared in the following manner:

2039 pounds (927 kg) of HTST pasteurized skim milk (less than 0.1% by weight butterfat and 8.6% solids) was placed in a stainless steel culturing vat equipped with an agitator. To this milk was added 26 pounds (12 kg) of a premixed stabilizer mixture which contained agar, modified food starch, pectin, guar gum and gelatin, about 7 pounds (3.2 kg) of non-heat modified nonfat dry milk solids, 25 pounds (11.4 kg) of granulated sugar (sucrose) and about 25 pounds (11.4 kg) of water. The resulting mixture was thoroughly blended, homogenized at 1000 to 1200 psig. (70.03 to 84.36 kg/cm$^2$) and vat pasteurized at 190° to 195° F. (87.7° to 90.6° C.) for 30 minutes. The homogenized and pasteurized mixture was then cooled to about 100° F. (37.8° C.), inoculated with a 1:1:1 mixture, by weight, of *Lactobacillus acidophilus, Lactobacillus bulgaricus* and *Streptococcus thermophilus* cultures and matanined in the vat at this temperature until the mixture reached a pH of about 4.3 to 4.9 and an acceptable custard consistency. The yogurt was cooled to about 65° to 70° F. (18.3° to 21.1° C.) and then pumped through a pressure valve to give it a smoother texture. Three hundred pounds (136 kg) of sucrose-containing preserves having less than 1000 calories per pound (2200 calories per kg) and 5 pounds (2.27 kg) of top flavor were mixed into the yogurt custard. The resulting low calorie, low carbohydrate, low fat yogurt had a smooth, creamy texture, contained blueberries uniformly mixed throughout, was the color of blueberries mixed with cream and had a predominantly sweet blueberry tast in combination with a slightly sharp and tangy yogurt taste. The product was packaged in convention eight ounce yogurt cups, contained 150 calories, 0.1% by weight fat, about 13% by weight carbohydrate, 4% by weight protein and 19% by weight solids per eight ounce (227 gram) serving, and remained stable for about 30 days at 35° to 40° F. (1.7° to 4.4° C.).

EXAMPLE III

A low calorie, low fat Swiss style yogurt was prepared in the very same manner as in Example II except that 135 pounds (61.36 kg) of liquid sugar (sucrose) containing about 67% solids was used in the base mix in place of the granulated sugar. The resulting yogurt product was in all respects comparable to the Example II product.

EXAMPLE IV

A low calorie, low fat Western style yogurt was prepared by first preparing a base mix of skim milk, stabilizers, non-heat modified nonfat milk solids, sugar and water as in Example II and, blending, homogenizing, vat pasteurizing, cooling and inoculating the mixture as in Example II using the very same culture mix. A sucrose-containing batch of blueberry preserves was prepared as in Example II and one ounce (28.4 grams) of these preserves was pumped into each of a number of conventional eight ounce (227 gram) yogurt cups. the cups were then filled with the inoculated 110° F. (43.3° C.) homogenized mixture and maintained at 110° F. (43.3° C.) until the yogurt reached a pH of about 4.3 to 4.9 and had an acceptable custard consistency. The cups were cooled to 35° to 40° F. (1.7° to 4.4° C.), at which temperature the product remained stable for about 30 days. The resulting low calorie, low carbohydrate, low fat yogurt had a smooth, creamy texture which had a slightly sweet, predominatly sharp yogurt taste before the preserves were stirred up from the bottom. This yogurt looked and tasted like the Swiss style yogurt of Example II and had the same calorie, fat, carbohydrate, protein and solids contents.

We claim:

1. A method for making a low butterfat, low total carbohydrate, low calorie custard type yogurt product containing fruit, said method comprising the steps of:
   (a) admixing a butterfat-containing milk product in sufficient amount to provide a butterfat content in said yogurt product of less than about 0.2% by weight, at least one stabilizer, a first nutritive sweetener, and non-heat modified nonfat dry milk solids in an amount effective to improve texture and body and to maintain the total solids level in said yogurt product in the range 17 to 20% by weight;
   (b) homogenizing said mixture at pressures in the range 500 to 5000 psig (35.15 to 351.5 kg/cm$^2$);
   (c) heating said mixture to a temperature in the range from about 190° to 195° F. (87.7° to 90.6° C.) for a time sufficient to form a uniform, substantially homogeneous mixture and to effect pasteurization;
   (d) cooling said homogenized mixture to a temperature of about 90° to 120° F. (32.3° to 48.9° C.);

(e) inoculating said cooled, homogenized mixture with a lactic acid producing bacterial yogurt culture mixture consisting essentially of, by weight, 30–50% Lactobacillus acidophilus, balance *Lactobacillus bulgaricus* and *Streptococcus thermophilus* in approximately equal proportions;

(f) maintaining said inoculated mixture at a temperatue of about 90° to 120° F. (32.2° to 48.9° C.) for a time sufficient to produce a pH in the range of about 4.3 to 4.9 for forming an acceptable taste and texture in said inoculated mixture;

(g) cooling said inoculated mixture to a temperature in the range 50° to 23.9° C.);

(h) forming said cooled inoculated mixture into a smooth textured product;

(i) blending said smooth textured product with low calorie fruit preserves to form said yogurt product, said low calorie fruit preserves comprising a second nutritive sweetener and containing not more than 1000 calories per pound (2200 calories per kilogram) thereof, said first and second nutritive sweeteners being present in amounts such that the total carbohydrate content of said yogurt product does not exceed about 12 to 13% by weight;

(j) cooling said blend of fruit preserves and smooth textured product to a temperature sufficiently low to stop fermentation; and (k) adding said blend of fruit preserves and smooth textured product into individual yogurt cups, said yogurt product being characterized by the absence of free moisture within the cups.

2. A method for making a low butterfat, low total carbohydrate, low calorie custard type yogurt product containing fruit, said method comprising the steps of:

(a) admixing a butterfat-containing milk product in sufficient amount to proivde a butterfat content in said yogurt product of less than about 0.2% by weight, at least one stabilizer, a first nutritive sweetener, and non-heat modified nonfat dry milk solids in an amount effective to improve texture and body and to maintain the total solids level in said yogurt product in the range 17 to 20% by weight;

(b) homogenizing said mixture at pressures in the range 500 to 5000 psig (35.15 to 351.5 kg/cm²);

(c) heating said mixture to a temperature in the range from abut 190° to 195° F. (87.7° to 90.6° C.) for a time sufficient to form a uniform, substantially homogeneous mixture and to effect pasteurization;

(d) cooling said homogenized mixture to a temperature of about 90° to 120 ° F. (32.3° to 48.9° C.);

(e) inoculating said cooled homogenized mixture with a lactic acid producing bactrerial yogurt culture mixture consisting essentially of, by weight, 30–50% *Lactobacillus acidophilus*, balance *Lactobacillus bulgaricus* and *Streptococcus thermophilus* in approximately equal proportions;

(f) adding said inoculated mixture into individual yogurt cups containing low calorie fruit preserves, said low calorie fruit preserves comprising a second nutritive sweetener and containing not more than 1000 calories per pound (2200 calories per kilogram) thereof, said first and second nutritive sweeteners being present in amounts such that the total carbohydrate content of said yogurt product does not exceed about 12–13% by weight;

(g) maintaining said fruit preserves and inoculated mixture at at temperature of about 90° to 120° F. (32.2° to 48.9° C.) for a time sufficient to produce a pH in the range of about 4.3 to 4.9 for forming an acceptable taste and texture in said inoculated mixture; and (h) cooling said fruit preserves and inoculated mixture to a temperature sufficiently low to stop fermentation, said yogurt product being characterized by the absence of free moisture within the cups.

3. A method, as claimed in claims 1 or 2, wherein said milk product comprises skim milk having a fat content of less about 0.2% by weight.

4. A method, as claimed in claim 3, wherein said skim milk has a fat content of less than about 0.1% by weight.

5. A method, as claimed in claims 1 or 2, wherein said first and second nutritive sweeteners are selected from the group consisting of monosaccharides, disaccharides, and mixture thereof.

6. A method, as claimed in claims 1 or 2, wherein said first nutritive sweetener, comprises aspartame.

7. A method, as claimed in claims 1 or 2, wherein said second nutritive sweetener comprises aspartame.

8. A method, as claimed in claims 1 or 2, wherein said first nutritive sweetener is sucrose.

9. A method, as claimed in claims 1 or 2, wherein said second nutritive sweetener comprises from 40 to 100% sucrose.

10. A method, as claimed in claim 9, wherein said second nutritive sweetener comprises fructose.

11. A method, as claimed in claims 1 or 2, wherein said bacterial yogurt culture mixture consists essentially of *Lactobacillus acidophilus*, *Lactobacillus bulgaricus* and *Streptococcus thermophilus* in equal proportions by weight.

12. A method, as claimed in claims 1 or 2, wherein said bacterial yogurt culture mixture consists essentially of, by weight, 40% *Lactobacillus acidophilus*, 30% *Lactobacillus bulgaricus* and 30% *Streptococcus thermophilus*.

13. A method, as claimed in claims 1 or 2, wherein said bacterial yogurt culture mixture consists essentially of, by weight, 50% *Lactobacillus acidophilus*, 25% *Lactobacillus bulgaricus* and 25% *Streptococcus thermophilus*.

14. A method, as claimed in claims 1 or 2, wherein said low calorie fruit preserves comprise about 40% to 50% by weight of fruit and a syrup for said fruit.

15. A method,a as claimed in claim 14, wherein said fruit preserves are admixed with said inoculated mixture in an amount sufficient to probide a fruit content in said yogurt product in an amount from 12 to 20% by weight.

16. A method, as claimed in claims 1 or 2, wherein the pH of said fruit preserves is adjusted to the range 4.1 to 4.3 prior to admixture with the inoculated mixture.

17. A method, as claimed in claims 1 or 2, including the step of high tempeature, short time pasteurizing of said mixture prior to homogenizing.

18. A method, as claimed in claims 1 or 2, wherein the pH produced in said inoculated mixture is in the range of about 4.5 to 4.7.

19. A method, as claimed in claims 1 or 2, wherein said time sufficient in step (b) is from about 20 to 60 minutes.

20. A method, as claimed in claims 1 or 2, wherein said homogenizing pressure in in the range 1000 to 2000 psig (70.03 to 140.06 kg/cm²).

21. A method, as claimed in claims 1 or 2, wherein said temperature sufficientlly low to stop fermentation is in the range from 35° to about 50° F. (1.7° to 10° C.).

22. A method, as claimed in claims 1 or 2, wherein said temperature sufficiently low to stop fermentation is in the range from 35° to 40° F. (1.7 to 4.4° C.).

23. In a method for making a less than about 0.2% by weight fat, low carbohydrate, low calorie custard type yogurt product containing fruit, comprising the steps of admixing a butterfat-containing milk product in sufficient amount to provide said fat content in said product, at least one stabilizer, a nutritive sweetener and nonfat dry milk solids in an amount effective to improve texture and body and to maintain the total solids level in said yogurt product in the range 17 to 20% by weight, homogenizing said mixture at pressures in the range 500 to 5000 psig (35.15 to 351.5 kg/cm$^2$), heating said mixture to a temperature in the range from about 190° to 195° F. (87.7 to 90.6° C. ), cooling said homogenized mixture to a temperature of about 90° to 120° F. (32.2 to 48.9° C.), inoculating said cooled homogenized mixture with a lactic acid producting bacterial yogurt culture mixture, maintaining said inoculated mixture at a temperature of about 90° to 120° F. (32.2 to 48.9° C.) for a time sufficient to produce a pH in the range of about 4.3 to 4.9 for forming an aceptable taste and texture in said inoculated mixture and adding said inoculated mixture to low calorie fruit preserves in individual yogurt cups either before or after said maintaining step, the improvement comprising:

said nonfat dry milk solids being of the non-heat modified type, said lactic acid producing bacterial yogurt culture mixture consisting essentially of, by weight, 30–50% *Lactobacillus acidophilus*, balance *Lactobacillus bulgaricus* and *Streptococcus thermophilus* in approximately equal proportions, and said yogurt product being characteized by the absence of free moisture within the cups.

24. A method, as claimed in claim 23, wherein said culture mixture consists essentially of *Lactobacillus acidoophilus, Lactobacillus bulgaricus* and *Streptococcus thermophilus* in approximately equal proportions by weight.

25. A method, as claimed in claim 23, wherein said culture mixture consists essentially of, by weight, 40% *Lactobacillus acidophilus* , 30% *Lactobacillus bulgaricus* and 30% *Streptococcus thermophilus.*

26. A method, as claimed in claim 23, wherein said culture mixture consists essentially of, by weight, 50% *Lactobacillus acidophilus*, 25% *Lactobacillus bulgaricus* and 25% *Streptococcus thermophilus.*

27. The product of the process of claim 1.
28. The product of the process of claim 2.
29. The product of the process of claim 3.
30. The product of the process of claim 23.

* * * * *